US012365135B1

United States Patent
Ahmed (10) Patent No.: US 12,365,135 B1
(45) Date of Patent: Jul. 22, 2025

(54) DEVICE CONNECTABLE TO AN ADDITIVE MANUFACTURING SYSTEM, AN ADDITIVE MANUFACTURING SYSTEM AND A METHOD OF PRODUCING A CONSTRUCTION ELEMENT

(71) Applicant: United Arab Emirates University, Al Ain (AE)

(72) Inventor: Waleed Ahmed, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/813,908

(22) Filed: Aug. 23, 2024

(51) Int. Cl.
| | | |
|---|---|---|
| *B29C 64/241* | (2017.01) | |
| *B29C 64/209* | (2017.01) | |
| *B29C 64/295* | (2017.01) | |
| *B29C 64/336* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC .......... *B29C 64/241* (2017.08); *B29C 64/209* (2017.08); *B29C 64/295* (2017.08); *B29C 64/336* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/118; B29C 64/209; B29C 64/227; B29C 64/241; B28B 1/001; B33Y 10/00; B33Y 30/00
See application file for complete search history.

(56) References Cited

U.S. PATENT DOCUMENTS

2021/0146631 A1* 5/2021 Li .............................. E04B 1/16

FOREIGN PATENT DOCUMENTS

CN 114103100 A * 3/2022

* cited by examiner

*Primary Examiner* — Jamel M Nelson
(74) *Attorney, Agent, or Firm* — MH2 Technology Law Group, LLP (57) ABSTRACT

The present disclosure is directed to a device connectable to an additive manufacturing system. The device includes a holder which is removably connectable to an extruder of the additive manufacturing system. Further, the device includes an orbital unit which is concentrically coupled to the holder and is adapted to rotate relative to the holder. Furthermore, the device includes at least one injector which is movably coupled to the orbital unit. The at least one injector is configured to inject at least one filler material within a construction element. Additionally, the device includes a control unit which is associated with the additive manufacturing system and is operatively coupled with the orbital unit and the at least one injector. The control unit is configured to selectively rotate the orbital unit and actuate at least one injector for injecting the at least one filler material within the construction element during additive manufacturing.

17 Claims, 10 Drawing Sheets

DEVICE CONNECTABLE TO AN ADDITIVE MANUFACTURING SYSTEM, AN ADDITIVE MANUFACTURING SYSTEM AND A METHOD OF PRODUCING A CONSTRUCTION ELEMENT

TECHNOLOGICAL FIELD

The present disclosure in general relates to the field of additive manufacturing. The present disclosure is further directed towards a device connectable to an additive manufacturing system and a method of producing a construction element.

BACKGROUND

The information in this section merely provides background information related to the present disclosure and may not constitute prior art(s) for the present disclosure.

Additive manufacturing, also known as 3D printing, is a process that creates objects by layering material according to digital models. The additive manufacturing enables fabricating or building, complex geometries and customization. Applications of the additive manufacturing span in various industries that may include rapid prototyping for designers, customized medical and dental implants, aerospace technology, automotive industries, personalized consumer goods, large-scale and small-scale construction projects, and educational and research tools. This transformative technology enhances efficiency and innovation, enabling new possibilities in design and production.

Further, the construction industry has significantly embraced additive manufacturing technology, leading to a revolution in building practices. This technology offers major sustainability benefits such as reducing environmental impacts associated with traditional construction methods, substantially reducing materials required for buildings, structures and the like. Unlike conventional methods that generate significant waste and pollution, the additive manufacturing uses a layer-by-layer approach to produce structures with minimal waste. This precise method enhances material efficiency, reduces resource depletion and time required for construction, marking a significant shift towards more sustainable construction methods.

One of the features of building structures using the additive manufacturing includes formation of air pockets. Once the additive manufacturing system finishes building a structure using different materials as per the desired pattern and matrix, the resulting structure may contain a plurality of air pockets. These air pockets may be beneficial for reducing material usage and weight, however, can significantly reduce a thermal insulation property of the structure. Proper thermal insulation is crucial for maintaining energy efficiency and comfort within the structure. In order to address this issue, the air pockets are typically filled with insulation materials to enhance the structure's thermal performance. However, filling these air pockets with insulation materials involves using a separate injection system along with the conventional additive manufacturing system. This process requires either removing the structure from a base of the additive manufacturing system and placing it under a separate injection system or displacing the additive manufacturing system from its initial position to fix the injection systems for filling the air pockets. Both approaches present significant challenges and drawbacks, as moving the additive manufacturing system can lead to misalignments and delays, while removing the structure can disrupt its alignment and stability, which is undesired.

Additionally, a need for separate or external injection systems for filling these air pockets increases the overall production time, as the additive manufacturing system has to be completely shut off during this process, thereby, halting the construction workflow and reducing productivity. This interruption is particularly detrimental to the efficiency of additive manufacturing, which is designed to be a continuous process. Further, accurate filling of the air pockets by the external injection system demands meticulous coordination and high precision, which is time-consuming and technically challenging. This increased fabrication time translates into higher labor costs and prolonged project timelines, diminishing a cost-effectiveness of using additive manufacturing for construction projects. Furthermore, a requirement for the separate injection systems increases the setup and maintenance costs. Additionally, need for specialized equipment and skilled personnel to operate and maintain these systems further escalates costs, which is undesired.

Present disclosure is directed to overcome one or more limitations stated above or any other limitations associated with the known arts.

GENERAL DESCRIPTION

One or more shortcomings of the prior art are overcome by a device and a system as claimed and additional advantages are provided through the present disclosure. Additional features and advantages are realized through the techniques of the present disclosure. Other embodiments, implementations and aspects of the disclosure are described in detail herein and are considered a part of the claimed disclosure.

A first aspect of the disclosure concerns a device connectable to an additive manufacturing system. The device includes a holder which is removably connectable to an extruder of the additive manufacturing system. Further, the device includes an orbital unit which is concentrically coupled to the holder, and is adapted to rotate relative to the holder. Furthermore, the device includes at least one injector which is movably coupled to the orbital unit. The at least one injector is configured to inject at least one filler material within a construction element. Additionally, the device includes a control unit which is associated with the additive manufacturing system and is operatively coupled with the orbital unit and the at least one injector. The control unit is configured to selectively rotate the orbital unit and actuate at least one injector for injecting the at least one filler material within the construction element during additive manufacturing.

According to a configuration of the first aspect, the orbital unit includes a first orbital ring which is rotatably coupled to the holder and a second orbital ring which is concentrically disposed on the first orbital ring and being configured to rotate independently of the first orbital ring.

According to a configuration of the first aspect, the device includes a first actuator that is operatively coupled to the first orbital ring, where the first actuator is adapted to rotate the first orbital ring relative to the holder.

According to a configuration of the first aspect, the device includes a second actuator that is operatively coupled to the second orbital ring, where the second actuator is adapted to rotate the second orbital ring relative to the first orbital ring.

According to a configuration of the first aspect, the first orbital ring includes a first bearing unit which is secured to an inner circumference of the first orbital ring. The first bearing unit is adapted rotate the first orbital ring relative to the holder. Further, the first orbital ring includes a first gear profile that is defined on an outer circumference of the first orbital ring. The first gear profile is adapted to engage with the first actuator via a mesh.

According to a configuration of the first aspect, the first actuator includes a first pinion gear which is engageable with the first gear profile of the first orbital ring.

According to a configuration of the first aspect, the second orbital ring includes a second bearing unit which is secured to an inner circumference of the second orbital ring. The second bearing unit is adapted rotate the second orbital ring relative to the first orbital ring. Further, the second orbital ring includes a second gear profile that is defined on an outer circumference of the second orbital ring. The second gear profile is adapted to engage with the second actuator via a mesh.

According to a configuration of the first aspect, the second actuator includes a second pinion gear which is engageable with the second gear profile of the second orbital ring.

According to a configuration of the first aspect, the outer circumference of the first orbital ring is defined with a second groove adapted to engage with the second bearing unit which is disposed along an inner circumference of the second orbital ring, configured to rotate the second orbital ring relative to the first orbital ring.

According to a configuration of the first aspect, the at least one injector is movably coupled to each of the first orbital ring and the second orbital ring to inject the at least one filler material.

According to a configuration of the first aspect, the at least one injector is operatively coupled to a linear actuator. The linear actuator is adapted to displace the at least one injector vertically relative to the orbital unit.

According to a configuration of the first aspect, the at least one injector includes a heating unit 117. The heating unit 117 is adapted to melt the at least one filler material stored in the at least one injector.

A second aspect of the disclosure concerns an additive manufacturing system for producing a construction element. The additive manufacturing system includes an extruder configured to extrude material layer-by-layer for producing the construction element. Further, the additive manufacturing system includes a sensor module that is connectable to the extruder. The sensor module is configured to detect one or more predetermined parameters of the construction element. Additionally, a control unit is communicatively coupled to the extruder and the sensor module. The control unit is configured to regulate movement of the extruder, based on signals corresponding to the one or more predetermined parameters received from the sensor module. Further, the additive manufacturing system includes a device. The device includes a holder which is removably connectable to an extruder of the additive manufacturing system. Further, the device includes an orbital unit which is concentrically coupled to the holder and is adapted to rotate relative to the holder. Furthermore, the device includes at least one injector which is movably coupled to the orbital unit. The at least one injector is configured to inject at least one filler material within a construction element. Additionally, the device includes a control unit which is associated with the additive manufacturing system and is operatively coupled with the orbital unit and the at least one injector. The control unit is configured to selectively rotate the orbital unit and actuate at least one injector for injecting the at least one filler material within the construction element during additive manufacturing.

According to a configuration of the second aspect, the orbital unit includes a first orbital ring which is rotatably coupled to the holder and a second orbital ring which is concentrically disposed on the first orbital ring and being configured to rotate independently of the first orbital ring.

According to a configuration of the second aspect, the system includes a first actuator which is operatively coupled to the first orbital ring. The first actuator is adapted to rotate the first orbital ring relative to the holder.

According to a configuration of the second aspect, the system includes a second actuator operatively coupled to the second orbital ring. The second actuator is adapted to rotate the second orbital ring relative to the first orbital ring.

According to a configuration of the second aspect, the first orbital ring includes a first bearing unit which is secured to an inner circumference of the first orbital ring. The first bearing unit is adapted rotate the first orbital ring relative to the holder. Further, the first orbital ring includes a first gear profile that is defined on an outer circumference of the first orbital ring. The first gear profile is adapted to engage with the first actuator via a mesh.

According to a configuration of the second aspect, the second orbital ring includes a second bearing unit which is secured to an inner circumference of the second orbital ring. The second bearing unit is adapted rotate the second orbital ring relative to the first orbital ring. Further, the second orbital ring includes a second gear profile that is defined on an outer circumference of the second orbital ring. The second gear profile is adapted to engage with the second actuator via a mesh.

According to a configuration of the second aspect, the at least one injector is movably coupled to each of the first orbital ring and the second orbital ring to inject the at least one filler material.

A third aspect of the disclosure concerns a method for producing a construction element. The method includes operating an extruder of an additive manufacturing system by a control unit, to extrude an outer layer, where the outer layer defines an enclosure. Further, the control unit is configured to operate the extruder, to extrude an inner matrix within the enclosure, where the outer layer and the inner matrix are formed by depositing successive layers. Here, the inner matrix defines a plurality of air pockets. extruder to extrude an inner matrix within the enclosure, the outer layer and the inner matrix formed by depositing successive layers. Here, the inner matrix defines a plurality of air pockets. Further, the control unit rotates an orbital unit relative to the extruder and operates at least one injector for injecting at least one filler material into at least one air pocket of the plurality of air pockets.

According to a configuration of the third aspect, the method further includes defining predefined locations of plurality of air pockets within the construction element to guide the injection of the at least one filler material by the at least one injector after depositing each successive layer of the construction element using the additive manufacturing system.

The foregoing description is illustrative only and is not intended to be in any way limiting. In addition to the illustrative aspects, embodiments and features described above, further aspects, embodiments, and features will become apparent by reference to the drawings and the following description.

EMBODIMENTS

The present disclosure also encompasses embodiments as defined in the following numbered phrases. It should be noted that these numbered embodiments intended to add to this disclosure and is not intended in any way to be limiting.

1. A device connectable to an additive manufacturing system, the device comprising: a holder removably connectable to an extruder of an additive manufacturing system; an orbital unit concentrically coupled to the holder, and adapted to rotate relative to the holder; at least one injector movably coupled to the orbital unit, the at least one injector being configured to inject at least one filler material within a construction element; and a control unit associated with the additive manufacturing system and operatively coupled with the orbital unit and the at least one injector, wherein the control unit being configured to selectively rotate the orbital unit and actuate at least one injector for injecting the at least one filler material within a construction element during additive manufacturing.

2. The device of embodiment 1, wherein the orbital unit comprises: a first orbital ring rotatably coupled to the holder; and a second orbital ring concentrically disposed on the first orbital ring and being configured to rotate independently of the first orbital ring.

3. The device of embodiment 2, comprises a first actuator operatively coupled to the first orbital ring, wherein the first actuator is adapted to rotate the first orbital ring relative to the holder.

4. The device of embodiment 2, comprises a second actuator operatively coupled to the second orbital ring, wherein the second actuator is adapted to rotate the second orbital ring relative to the first orbital ring.

5. The device of embodiment 2, wherein the first orbital ring comprises: a first bearing unit secured to an inner circumference of the first orbital ring, the first bearing unit is adapted rotate the first orbital ring relative to the holder; and a first gear profile defined on an outer circumference of the first orbital ring, adapted to engage with the first actuator via a mesh.

6. The device of embodiment 3 and 5, wherein the first actuator comprises a first pinion gear engageable with the first gear profile of the first orbital ring.

7. The device of embodiment 2, wherein the second orbital ring comprises: a second bearing unit secured to an inner circumference of the second orbital ring, the second bearing unit is adapted rotate the second orbital ring relative to the first orbital ring; and a second gear profile defined on an outer circumference of the second orbital ring, adapted to engage with the second actuator via a mesh.

8. The device of embodiment 4 and 7, wherein the second actuator comprises a second pinion gear engageable with the second gear profile of the second orbital ring.

9. The device of embodiment 5 and 7, wherein the outer circumference of the first orbital ring is defined with a second groove adapted to engage with the second bearing unit disposed along an inner circumference of the second orbital ring, configured to rotate the second orbital ring relative to the first orbital ring.

10. The device of embodiment 1 and 2, wherein the at least one injector is movably coupled to each of the first orbital ring and the second orbital ring to inject the at least one filler material.

11. The device of embodiment 1, wherein the at least one injector is operatively coupled to a linear actuator, the linear actuator is adapted to displace the at least one injector vertically relative to the orbital unit.

12. The device of embodiment claim 1, wherein the at least one injector comprises a heating unit, adapted to melt the at least one filler material stored in the at least one injector.

13. An additive manufacturing system for producing a construction element, the system comprising: an extruder adapted to extrude a material layer-by-layer for producing the construction element; a sensor module connectable to the extruder, the sensor module configured to detect one or more predetermined parameters of the construction element; a control unit communicatively coupled to the extruder and the sensor module, the control unit configured to regulate movement of the extruder, based on signals corresponding to the one or more predetermined parameters received from the sensor module; and a device comprising: a holder removably connectable to the extruder; an orbital unit concentrically coupled to the holder, and adapted to rotate relative to the holder; at least one injector movably coupled to the orbital unit, the at least one injector being configured to inject at least one filler material within a construction element; and the control unit associated with the extruder and the sensor module, and operatively coupled with the orbital unit and the at least one injector, wherein the control unit being configured to selectively rotate the orbital unit and actuate at least one injector for injecting the at least one filler material within a construction element during additive manufacturing.

14. The system of embodiment 13, wherein the orbital unit comprises: a first orbital ring rotatably coupled to the holder; and a second orbital ring concentrically disposed on the first orbital ring and being configured to rotate independently of the first orbital ring.

15. The system of embodiment 14, comprises a first actuator operatively coupled to the first orbital ring, wherein the first actuator is adapted to rotate the first orbital ring relative to the holder.

16. The system of embodiment 14, comprises a second actuator operatively coupled to the second orbital ring, wherein the second actuator is adapted to rotate the second orbital ring relative to the first orbital ring.

17. The system of embodiment 14, wherein the first orbital ring comprises: a first bearing unit secured to an inner circumference of the first orbital ring, the first bearing unit is adapted rotate the first orbital ring relative to the holder; and a first gear profile defined on an outer circumference of the first orbital ring, adapted to engage with the first actuator via a mesh.

18. The system of embodiment 14, wherein the second orbital ring comprises: a second bearing unit secured to an inner circumference of the second orbital ring, the second bearing unit is adapted rotate the second orbital ring relative to the first orbital ring; and a second gear profile defined on an outer circumference of the second orbital ring, adapted to engage with the second actuator via a mesh.

19. The system of embodiment 13 and 14, wherein the at least one injector is movably coupled to each of the first orbital ring and the second orbital ring to inject the at least one filler material.

20. A method of producing a construction element by an additive manufacturing process, the method comprising: operating, by a control unit, an extruder of an additive manufacturing system to extrude an outer layer for defining an enclosure; operating, by the control unit, the extruder of the system to extrude an inner matrix within the enclosure, wherein the outer layer and the inner matrix being formed by depositing successive layers, and the inner matrix defining a plurality of air pockets; rotating, by the control unit, an orbital unit relative to the extruder; and operating, by the control unit, at least one injector for injecting at least one filler material into at least one air pocket of the plurality of air pockets.

21. The method of embodiment 22, further comprising defining predefined locations of the plurality of air pockets within the construction element to selectively operate the orbital unit and the at least one injector for injecting the at least one filler material into at least one air pocket of the plurality of air pockets after depositing each successive layer of the construction element.

BRIEF DESCRIPTION OF DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1:
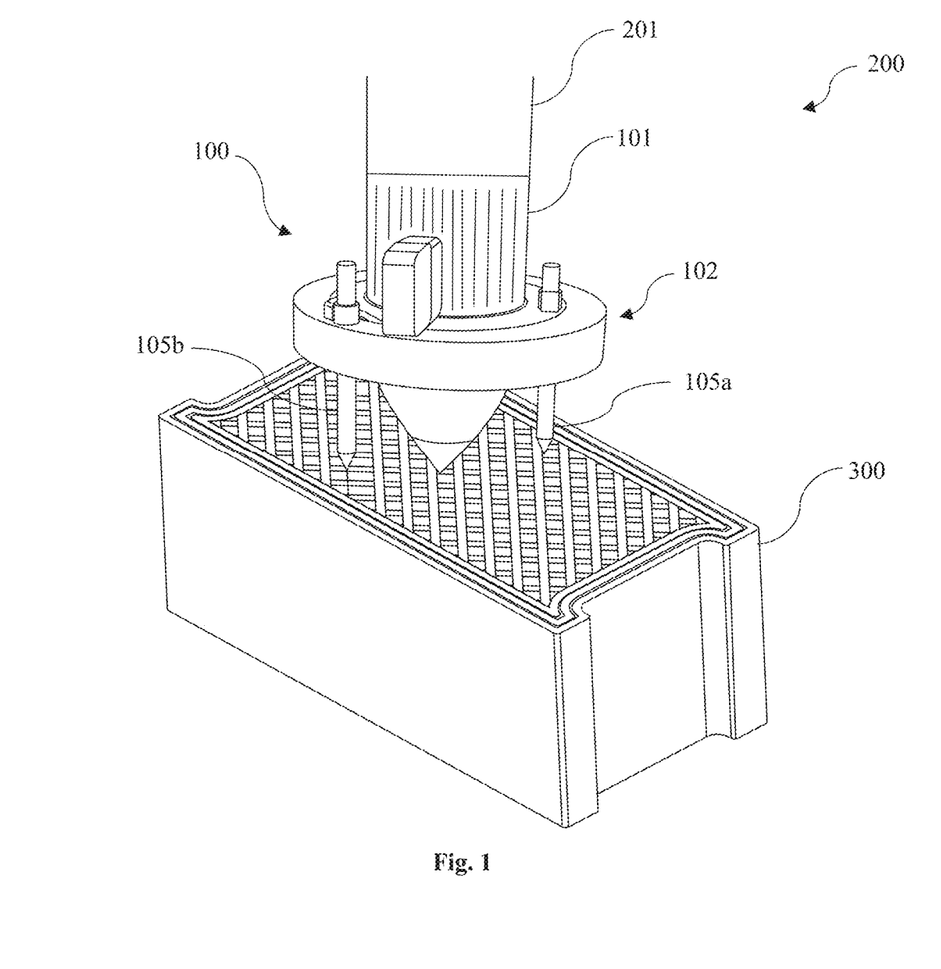
FIG. 1 illustrates a perspective view of an additive manufacturing system, according to an example of the present disclosure.
Figure 2:
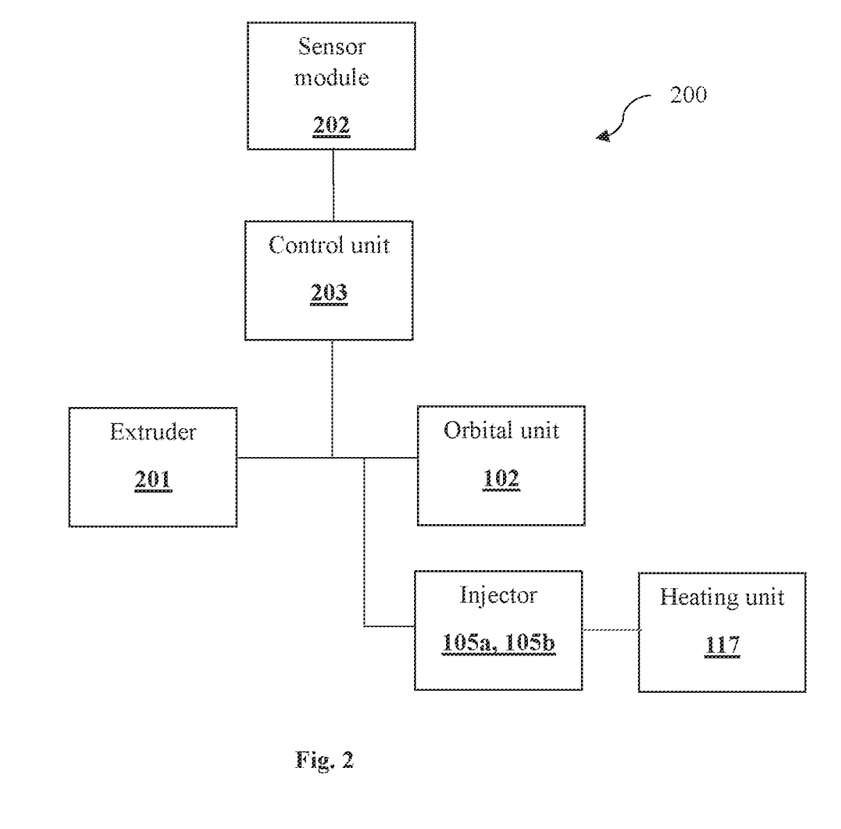
FIG. 2 illustrates a block diagram of the additive manufacturing system, according to an example of the present disclosure.

FIGS. 1 and 2, illustrate an additive manufacturing system 200 [also referred to as the 'system 200' hereinafter in the present disclosure], in accordance with an exemplary implementation of the present disclosure. The system 200 is configured to produce a construction element 300, by additive manufacturing. The term 'additive manufacturing' as used in the present disclosure refers to a process employed to produce a physical object from a three-dimensional [3D] digital model. The process of additive manufacturing is also referred to as 3D printing process or as three-dimensional printing process, and the same is used interchangeably in the present disclosure. The process of additive manufacturing or 3D printing includes laying a plurality of successive layers of materials, to form three dimensional objects in desired shape and form, which herein is referred to as 'construction element'. The term 'construction element' refers to a building block or a unit block that is constructed by additive manufacturing process by laying the plurality of successive layers made from specific material and/or constituents. For instance, for constructional applications such as walls, building portions, partitions, and the like, the 'construction element' can be considered as the building block or the unit block that may be stacked, interlocked, connected, coupled, bonded, and the like with other construction elements to produce such walls, building portions and the like.

The construction element 300 may include an outer layer. The outer layer may also be referred to as 'outer wall portion' or 'outer wall' hereinafter. The outer layer is configured to define or form an enclosure. In one implementation, the enclosure being defined by the outer layer may be hollow or void space capable of receiving, holding, accommodating and/or storing material. The outer layer may be formed by laying multiple layers of suitable material, where laying of such multiple layers is implemented through an extrusion process. In other words, the outer layer, upon extrusion, solidifies and forms a boundary wall for depositing of layers within the outer layer. The construction element 300 may further includes an inner matrix. The inner matrix may be formed by extrusion of layers within the enclosure. In one implementation, the outer layer and the inner matrix may be formed integrally, by depositing successive layers using the additive manufacturing system 200 [as shown in FIGS. 1 and 2]. Alternatively, the outer layer may be extruded before forming the inner matrix by the additive manufacturing system 200. In one implementation, the outer layer may be made of a first material and the inner matrix is made of a second material. The outer layer and the inner matrix may be integrally formed by depositing successive layers of the first material and the second material. In one implementation, the first material forming the outer layer may be same as that of the second material forming the inner matrix.

Further, in one implementation, the inner matrix may be defined by a first layup and a second layup laid over the first layup. The first layup may be laid along a first direction and across the enclosure and the second layup may be laid juxtaposing the first layup. That is, the second layup may be laid to crossover at least a portion of the first layup during forming of the inner matrix. For such configuration, the second layup may be laid along a second direction which may be different from the first direction along which the first layup is laid. Further, each of the first layup and the second layup may be laid across the enclosure defined by the outer layer. In one implementation, the first layup and the second layup may define a plurality of air pockets in the inner matrix. Each of the plurality of air pockets [also referred to as the air pockets hereinafter in the present disclosure] may be formed at the intersection of at least two opposing extrusions of the first layup and the second layup during the 3D printing process for producing the inner matrix. Formation of the air pockets may be a result of a plurality of layers of the first layup and the second layup being extruded at predefined opposing angles [for instance, the first layup being laid at 45 degrees in a clockwise direction, while the second layup being laid at 45 degrees in a counterclockwise direction], resulting in orientation of such plurality of air pockets being aligned in a defined pattern. In one implementation, the plurality of air pockets may constitute at least 50 percent of volume of space within the enclosure. The plurality of air pockets may be beneficial for reducing material usage and weight.

Additionally, the air pockets may be filled with a filler material. The filler material within the air pockets may act as an insulator or an insulation material and may result in increased thermal insulation of a structure that may be formed by the construction element 300, as thermal insulation is required for maintaining energy efficiency and comfort within the structure. Such air pockets infused/filled with the filler material, may form a contour of predetermined shape in the construction element 300. In one implementation, the filler material may be different from the material of the outer layer and the inner matrix of the construction element 300. Further, the filler material may be made of a third material that is different from the first material and the second material of the outer layer and the inner matrix, respectively. In an implementation, the filler material may be chosen such that the material improves thermal resistance of the construction element 300 and may be selected from at least one of or combinations of natural and synthetic materials. For example, the filler material may be a foam or a synthetic foam. In another implementation, the filler material may be including but not limited to a compressed plastic waste and compressed natural fibers. For example, the filler material may be at least one of dried and milled palm trunk wood, dried palm leaves, date palm tree leaves, crushed date pit and wood. The said compressed natural fibers are compressed by using binders including okra powder along with water.

In an implementation, the thermal resistance of the construction element 300 may be based on parameters including material, thickness, area, and geometry, of the outer wall and the inner matrix, and volume percentage defined by the plurality of air pockets in the construction element 300. Accordingly, in order to evaluate overall thermal insulation of the construction element 300, it would be required to evaluate contribution of said factors individually, rather than adhering to a predetermined range of thermal insulation. In addition, by customizing said factors, thermal insulation properties of the construction element 300 may be tailored to meet specific requirements and environmental conditions of intended application. In an implementation, the filler material may be chosen such that the material improves thermal resistance of the construction element 300. The thermal insulation for the outer layer of the construction element 300 may be calculated based on type of material used for constructing the outer layer and thickness of the outer layer. Further, thermal resistance of the inner matrix and the plurality of air pockets may be calculated by considering a projected area of region encompassing the inner matrix and the plurality of air pockets, that are positioned between the outer layers. Additionally, factors such as material properties and thickness of the first layup and the second layup further contribute to overall thermal resistance of the construction element 300. In an implementation, a comprehensive thermal resistance calculation formula may be applied for calculating the thermal resistance of the construction element 300. The formula may be based on the sum of the distinct thermal resistances of the various materials and air gaps in the construction element 300. The formula takes into account the air gap dimensions and shape, the insulation/filler contour shape and width, and the number of contours and materials.

Referring again to FIGS. 1 and 2, illustrating the system 200. The system 200 may include an extruder 201. The extruder 201 may be adapted to extrude or discharge a material to form the construction element 300. The extruder 201 may be configured to extrude the material layer-by-layer to form successive layers for producing the construction element 300. In some implementations, the system 200 may include more than one extruder 201, for extruding the material and producing the construction element 300. The extruder 201 may be configured to discharge the material at a predetermined flow rate such that, the discharged material may get laid in a defined pattern as transversed by the extruder 201, to form the construction element 300. In an implementation, the extruder 201 may be coupled to a nozzle at a lower portion thereof, to extrude the material at the predetermined flow rate and in a defined pattern.

Further, the system 200 may include a sensor module 202. The sensor module 202 may be configured to be connectable to the extruder 201. In an implementation, the sensor module 202 may be coupled to the lower portion the extruder 201 [i.e., proximal to section of the extruder 201 through which the material is discharged] or may be coupled to other portions of the extruder 201, based on sensing requirement. In an implementation, the sensor module 202 may include but not limited to a proximity sensor, temperature sensor, tactile sensor, resistance sensor, displacement sensor and any other sensor capable of sensing required operational parameters during additive manufacturing. Furthermore, the sensor module 202 may be configured to detect one or more predetermined parameters of the construction element 300. In an implementation, the one or more predetermined parameters detected or determined by the sensor module 202 may be including but not limited to faulty layers, length, width and volume of the construction element 300, location and dimensions of air pockets or cavities defined in the construction element 300, volume of filler material required to be injected into the air pockets or cavities and the like.

Referring now to FIG. 2, the system 200 may include a control unit 203. The control unit 203 may be communicatively coupled to the extruder 201 and the sensor module 202. The control unit 203 may be configured to regulate movement of the extruder 201, based on signals corresponding to the one or more predetermined parameters received from the sensor module 202. Further, the control unit 203 may also be configured to operate the extruder 201 to extrude the material based on additive manufacturing parameters and requirements.

Further, as illustrated in FIGS. 1, 3, 4 and 5, the system 200 may include a device 100. In an implementation, the device 100 may be connectable to a portion of the system 200. The device 100 may include a holder 101 which may be removably connectable to the extruder 201 of the system 200. The holder 101 may be defined with a profile and dimensions that enable connection of the holder 101 on the extruder 201. The holder 101 may be removably connected to the extruder 201 by suitable fastening means. For example, the holder 101 may be fastened to the extruder 201 through including but not limited to suitable fasteners, by snap fitting arrangements, by threaded arrangements and any other suitable means capable of removably connecting the holder 101 with the extruder 201. Furthermore, the device 100 may include an orbital unit 102 which may be concentrically coupled to the holder 101. The orbital unit 102 may be adapted to rotate relative to the holder 101. In an implementation, the holder 101 may be defined with a first groove 101a which may be adapted to receive the orbital unit 102 and aid in rotation of the orbital unit 102 relative to the holder 101. In an implementation, the orbital unit 102 may include a first orbital ring 103 that may be rotatably coupled to the holder 101 and a second orbital ring 104 which may be concentrically disposed on the first orbital ring 103 and may be configured to rotate independently of the first orbital ring 103. Additionally, the device 100 may include a first actuator 106 which may be operatively coupled to the first orbital ring 103, where the first actuator 106 may be adapted to rotate the first orbital ring 103 relative to the holder 101. Furthermore, the device 100 may include a second actuator 107 which may be operatively coupled to the second orbital ring 104. The second actuator 107 may be adapted to rotate the second orbital ring 104 relative to the first orbital ring 103. In an implementation, the first actuator 106 and the second actuator 107 may be a rotary actuator that may be capable of converting energy into rotational motion. For example, the first actuator 106 and the second actuator 107 may be including but not limited to an electrical motor. Further, in the illustrated implementation, the device 100 includes one first actuator 106 and one second actuator 107, however, this should not be considered as a limitation as the device 100 may include more than one first actuator 106 and more than one second actuator 107 based on operational requirement of the device 100. In an implementation, the first actuator 106 and the second actuator 107 may be supported adjacent to the first orbital ring 103 and the second orbital ring 104, respectively, by a casing [not shown in Figs]. The casing may be adapted to support and accommodate the first actuator 106 and the second actuator 107.

Figure 4:
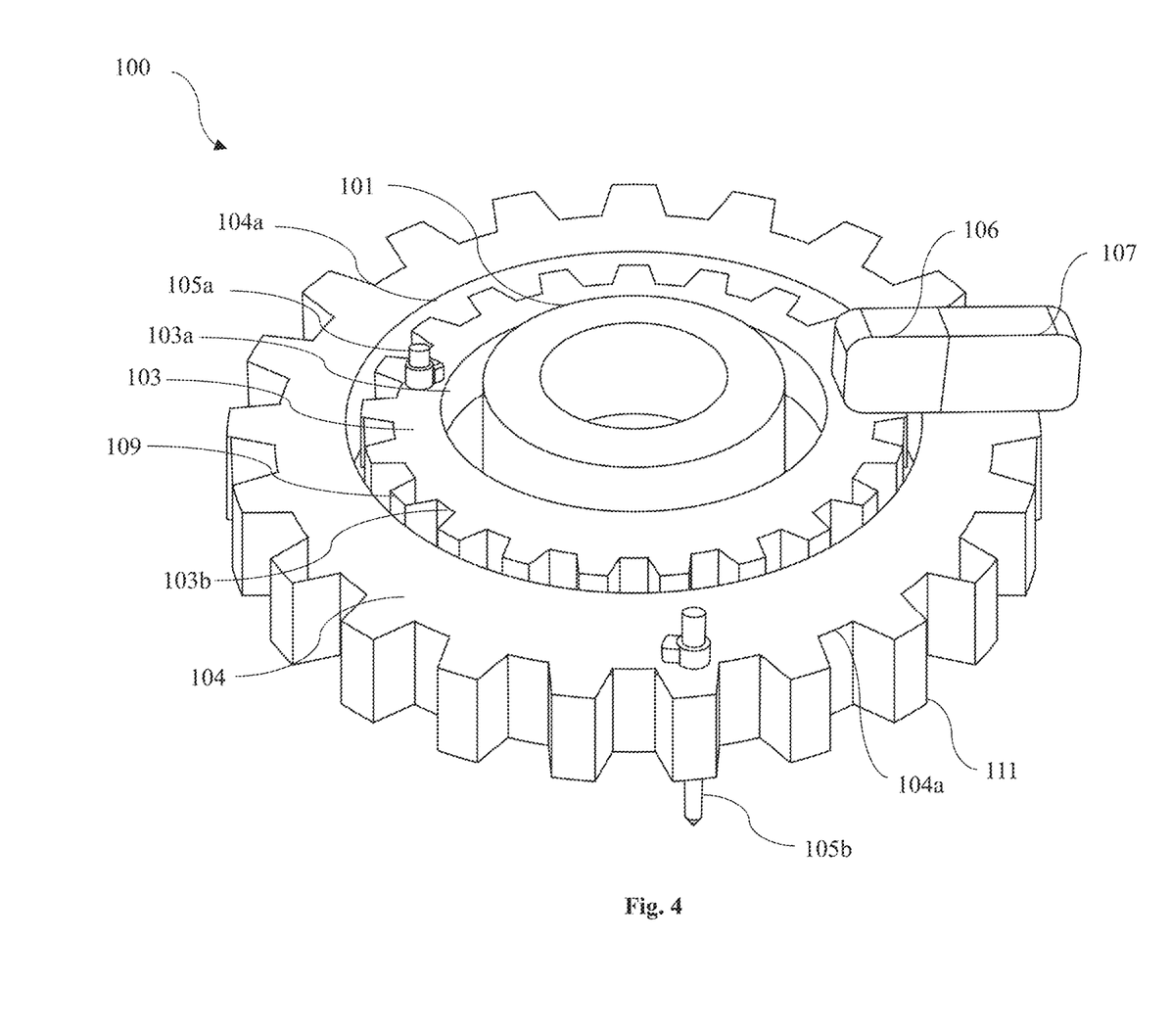
FIG. 4 illustrates a magnified view of the device of FIG. 3.
Figure 5:
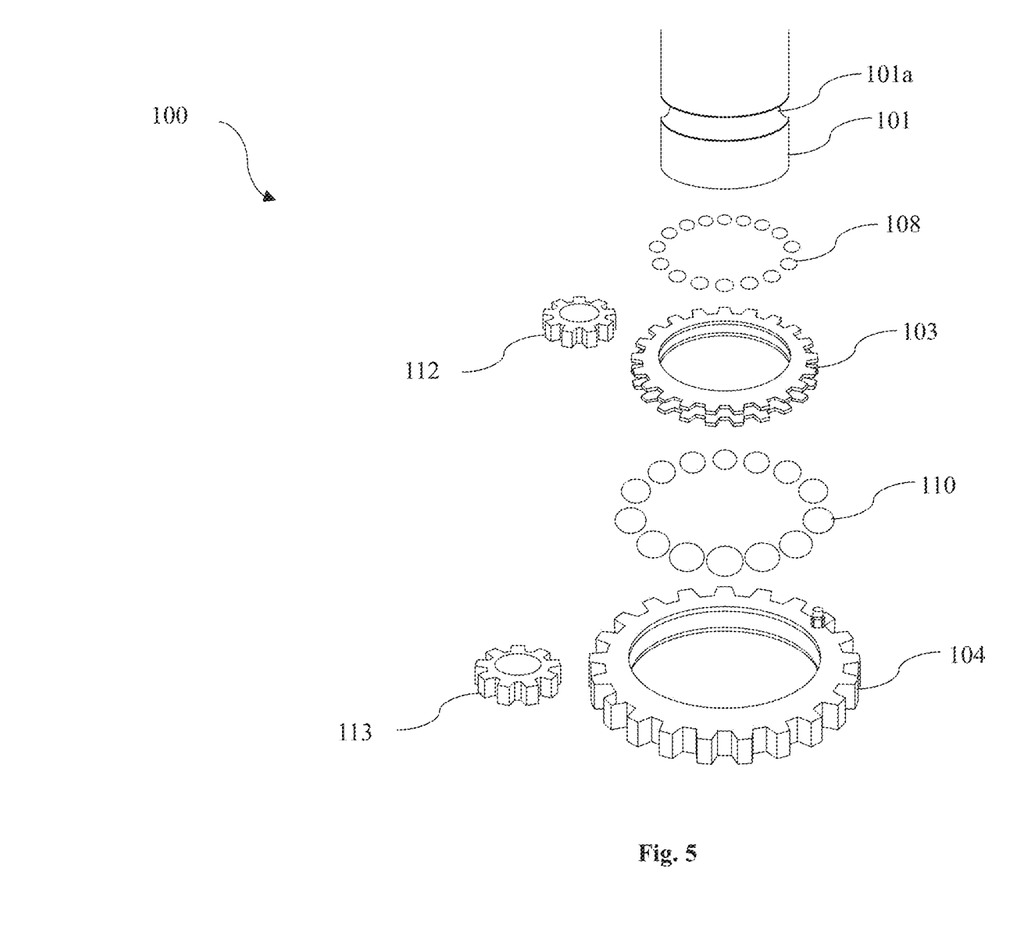
FIG. 5 illustrates an exploded view of the device of FIG. 4.
Figure 6:
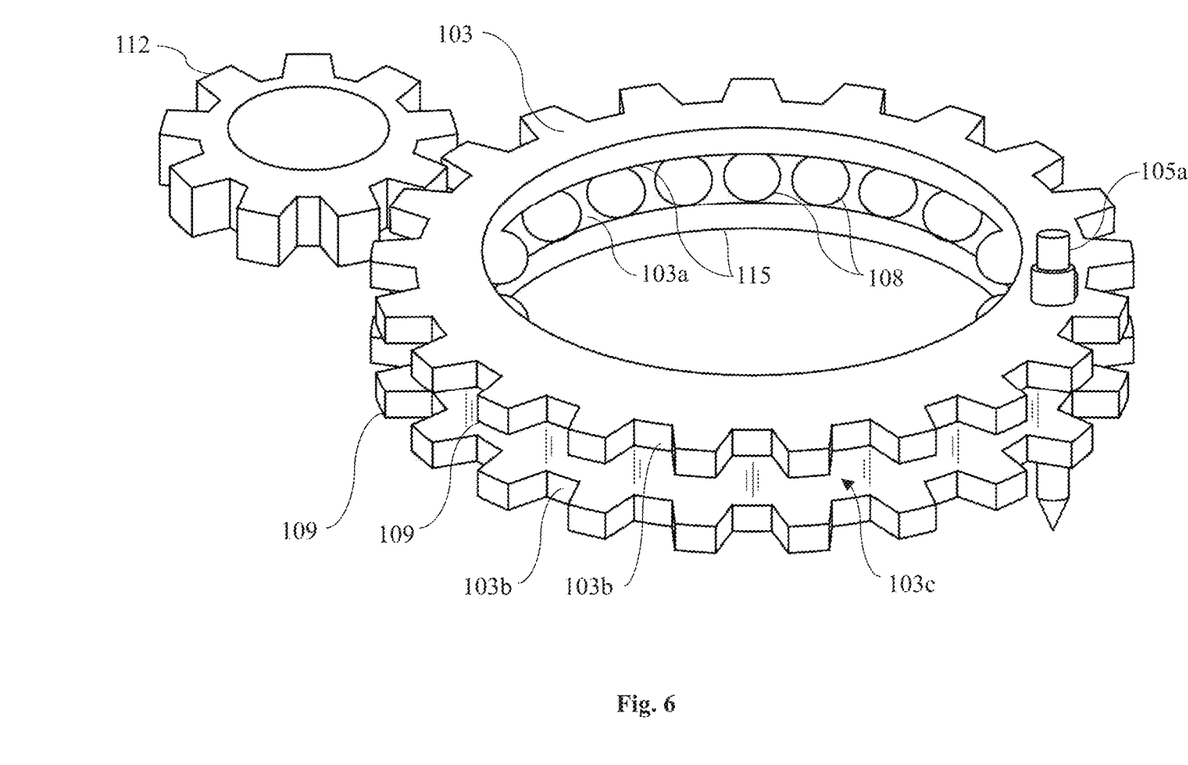
FIG. 6 illustrates a perspective view of a first orbital ring engaged with a first pinion gear of a first actuator, according to an example of the present disclosure.
Figure 8:
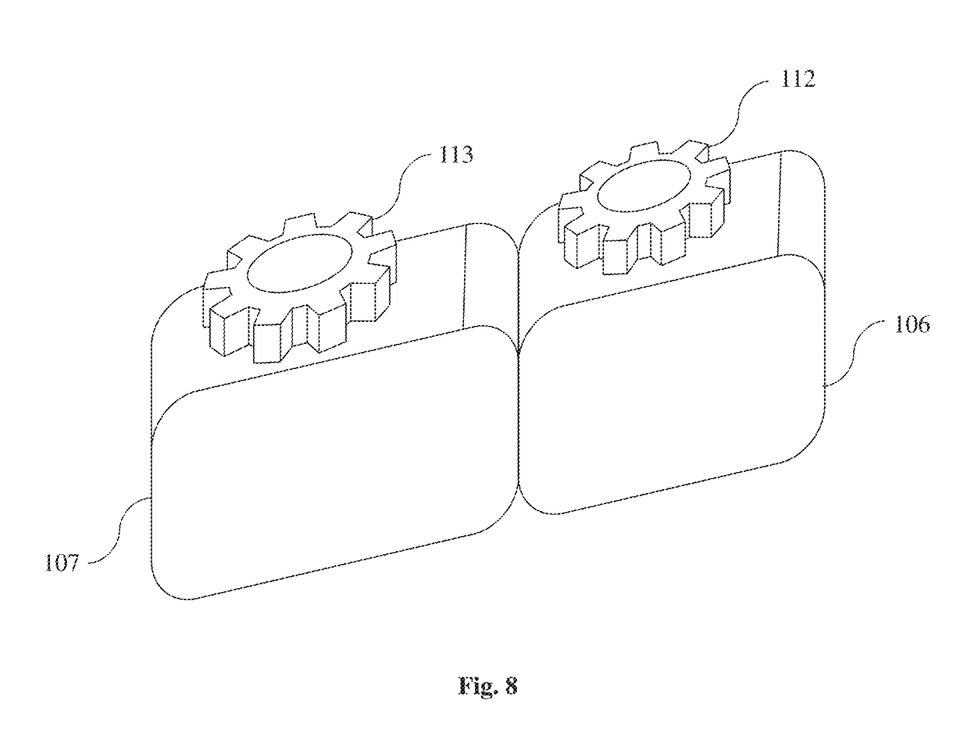
FIG. 8 illustrates a bottom perspective view of the first actuator and the second actuator, according to another example of the present disclosure.

Referring now to FIGS. 4, 5 and 6, the first orbital ring 103 may include a first bearing unit 108 which may be secured to an inner circumference 103a of the first orbital ring 103. In an implementation, the first bearing unit 108 may be disposed within a cavity defined along the inner circumference 103a of the first orbital ring 103. Edges of the cavity may be defined with a first set of flanges 115. The first set of flanges 115 may be structured to retain the first bearing unit 108 within the cavity and allow only a portion of the first bearing unit 108 to protrude out of the cavity. The first bearing unit 108 may be adapted to rotate the first orbital ring 103 relative to the holder 101. That is, the portion of the first bearing unit 108 protruding out of the cavity due to the retention by the first set of flanges 115 may engage with the first groove 101a defined on the holder 101 and facilitate rotation of the first orbital ring 103 relative to the holder 101. For example, the first bearing unit 108 may include a plurality of ball bearings which may be disposed along the inner circumference 103a of the first orbital ring 103. Further, the first bearing unit 108 may include any other type of bearings or rotational member adapted to allow independent rotation of the first orbital ring 103 relative to the holder 101. The first bearing unit 108 may be configured to engage with a surface of the holder 101 and facilitate rotation of the first orbital ring 103. In an implementation, the first bearing unit 108 may be configured to engage with the first groove 101a which may be defined on a surface of the holder 101 to facilitate rotation of the first orbital ring 103 relative to the holder 101. Furthermore, the first orbital ring 103 may include a first gear profile 109 which may be defined on an outer circumference 103b of the first orbital ring 103 opposite to the inner circumference 103a. The first gear profile 109 may be adapted to meshingly engage with the first actuator 106. Further, the first actuator 106 may include a first pinion gear 112 [as seen in FIG. 8] which may be engageable with the first gear profile 109 of the first orbital ring 103 to exert rotational motion on to the first orbital ring 103. The gear ratio between the first gear profile 109 and the first pinion gear 112 may be defined based on the operational parameters of the device 100.

Figure 7:
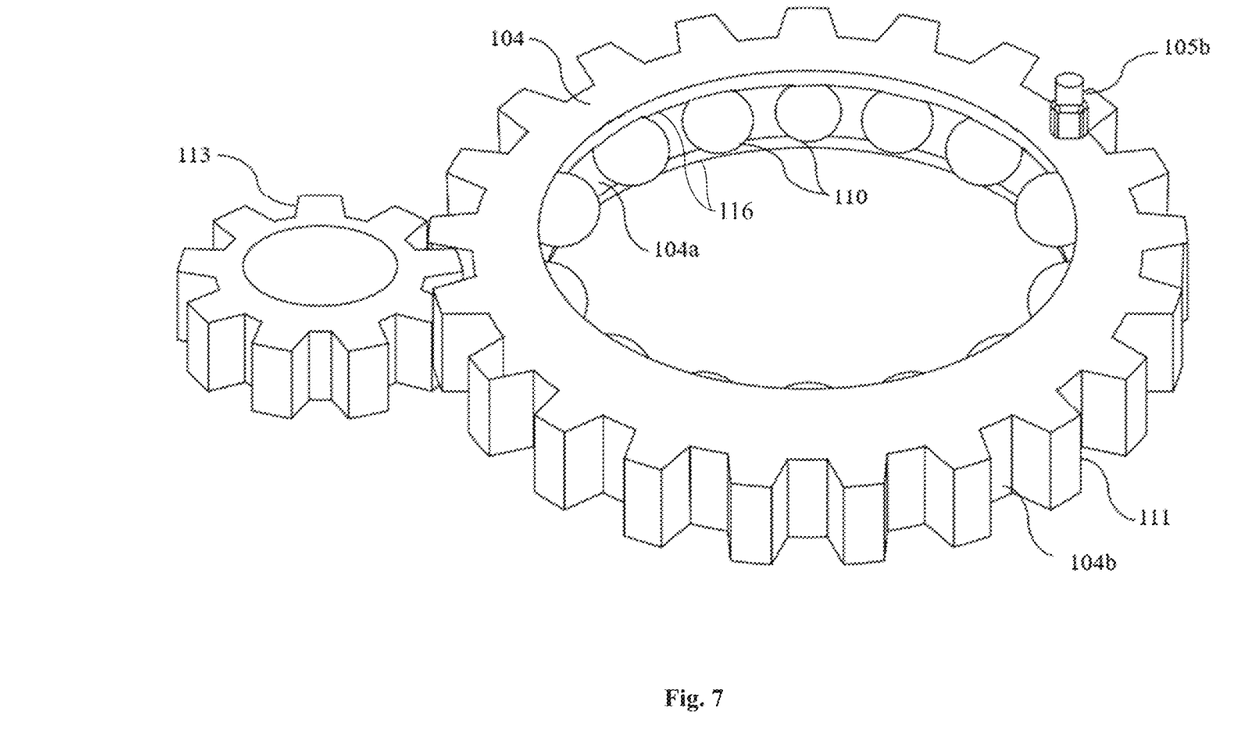
FIG. 7 illustrates a perspective view of a second orbital ring engaged with a second pinion gear of a second actuator, according to an example of the present disclosure.

Referring now to FIGS. 4, 5 and 7, the second orbital ring 104 may include a second bearing unit 110 which may be secured to an inner circumference 104a of the first orbital ring 103. In an implementation, the second bearing unit 110 may be disposed within a cavity defined along the inner circumference 104a of the second orbital ring 103. Edges of the cavity may be defined with a second set of flanges 116. The second set of flanges 116 may be structured to retain the second bearing unit 110 within the cavity and allow only a portion of the second bearing unit 110 to protrude out of the cavity. The second bearing unit 110 may be adapted to rotate the second orbital ring 104 relative to the first orbital ring 103. For example, the second bearing unit 110 may include a plurality of ball bearings which may be disposed along the inner circumference 104a of the second orbital ring 104. Further, the second bearing unit 110 may include any other type of bearings or rotational member adapted to allow independent rotation of the second orbital ring 104 relative to the first orbital ring 103. The second bearing unit 110 may be configured to engage with a surface of the first orbital ring 103 and facilitate rotation of the second orbital ring 104. Furthermore, the second orbital ring 104 may include a second gear profile 111 which may be defined on an outer circumference 104b of the second orbital ring 104 opposite to the inner circumference 104a. The second gear profile 111 may be adapted to engage with the second actuator 107 via a mesh. Further, the second actuator 107 may include a second pinion gear 113 [as seen in FIG. 8] which may be engageable with the second gear profile 111 of the second orbital ring 104 to exert rotational motion on to the second orbital ring 104. The gear ratio between the second gear profile 111 and the second pinion gear 113 may be defined based on the operational parameters of the device 100.

In an implementation, the outer circumference 103b of the first orbital ring 103 may be defined with a second groove 103c adapted to engage with the second bearing unit 110 that may be disposed along the inner circumference 104a of the second orbital ring 104. The second groove 103c may be configured to aid in rotation of the second orbital ring 104 relative to the first orbital ring 103. That is, the portion of the second bearing unit 110 protruding out of the cavity due to the retention by the second set of flanges 116 may engage with the second groove 103c defined on the first orbital ring 103 and facilitate rotation of the second orbital ring 104 relative to the first orbital ring 103. In an implementation, the second groove 104c may be defined on a portion of the first gear profile 109 to establish contact between the outer circumference 103b of the first orbital ring 103 and the second bearing unit 110 of the second orbital ring 104. In another implementation, the outer circumference 103a of the first orbital ring 103 may be partially defined with the first gear profile 109 that may be sufficient to establish contact with the first pinion gear 112 of the first actuator 106 and the remaining portion of the outer circumference 103b may be defined with the second groove 103c adapted to engage with the second bearing unit 110. In yet another implementation, the second bearing unit 110 of the second orbital ring 104 may be in engagement with the first gear profile 109 of the first orbital ring 103.

In an implementation, the first orbital ring 103 and the second orbital ring 104, may be adapted to substantially rotate 360 degrees independently, of each other. Further, the first actuator 106 and the second actuator 107 may be adapted to rotate the first orbital ring 103 and the second orbital ring 104 selectively in both the clockwise and anti-clockwise directions.

Figure 3:
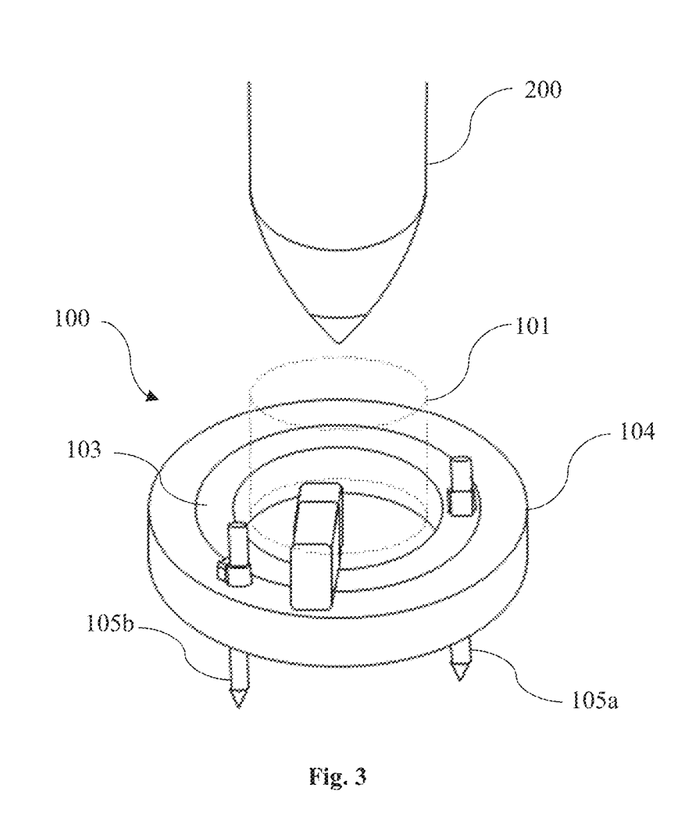
FIG. 3 illustrates a perspective view of the device connectable to the additive manufacturing system, according to an example of the present disclosure.
Figure 9:
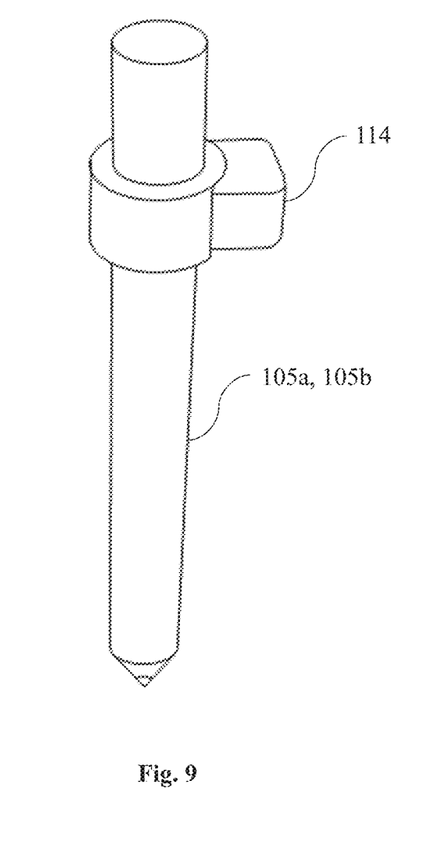
FIG. 9 illustrates a perspective view of the at least one injector, according to another example of the present disclosure.

Additionally, the device 100 may include at least one injector 105a, 105b as seen in FIGS. 3, 4 and 9. The at least one injector 105a, 105b may be movably coupled to the orbital unit 102. The at least one injector 105a, 105b may be configured to inject at least one filler material into or within the construction element 300. In one implementation, the injector 105a, 105b may be configured to infuse or inject the at least one filler material into at least one air pocket of the plurality of air pockets that may be defined in the construction element 300. The at least one injector 105a, 105b may be movably coupled to each of the first orbital ring 103 and the second orbital ring 104 to inject the at least one filler material. In an implementation, the at least one injector 105a, 105b movably coupled to the first orbital ring 103 and the second orbital ring 104 may be independently operated to inject the at least one filler material within the construction element 300. In an implementation, the at least one injector 105a, 105b may be operatively coupled to a linear actuator 114. The linear actuator 114 may be adapted to displace the at least one injector 105a, 105b vertically relative to the orbital unit 102. That is, the linear actuator 114 may be adapted to displace the at least one injector 105a, 105b vertically relative to the first orbital ring 103 upon being movably coupled to the first orbital ring 103 and displace the at least one injector 105a, 105b vertically relative to the second orbital ring 104 upon being movably coupled to the second orbital ring 104. In an implementation, the linear actuator 114 may be any electrical actuator that may be capable of converting energy into linear motion. In another implementation, the linear actuator 114 may be any other type of actuator which may be coupled to the at least one injector 105a, 105b, such that actuation of the linear actuator 114 may vertically displace the at least one injector 105a, 105b relative to the first orbital ring 103 and/or the second orbital ring 104. For example, the linear actuator 114 may be a stepper motor which when actuated may displace the at least one injector 105a, 105b linearly in the vertical direction relative to the first orbital ring 103 and/or the second orbital ring 104. Furthermore, the at least one injector 105a, 105b may include a heating unit 117, which may be adapted to melt the at least one filler material stored in the at least one injector 105a, 105b before injecting the filler material within the construction element 300.

In an implementation, the at least one injector 105a movably coupled to the first orbital ring 103 may store and inject a filler material which may be different from the filler material that may be stored in the at least one injector 105b movably coupled to the second orbital ring 104. In another implementation, the at least one injectors 105a, 105b coupled to both the first orbital ring 103 and the second orbital ring 104 may store and inject the same filler material.

Further, referring back to FIG. 2, the device 100 may include the control unit 203 which may be associated with the additive manufacturing system 200. The control unit 203 may be operatively coupled with the orbital unit 102 and the at least one injector 105a, 105b. That is, the control unit 203 may be operatively coupled to each of the first actuator 106, the second actuator 107, the linear actuator 114 and the at least one injector 105a, 105b to operate the orbital unit 102 and the at least one injector 105a, 105b. In an implementation, the control unit 203 may be configured to selectively rotate the orbital unit 102 by actuating the first actuator 106 and the second actuator 107, and actuate at least one injector 105a, 105b for injecting the at least one filler material within the construction element 300 during additive manufacturing. Further, control unit 203 may be configured to monitor the additive manufacturing process and activate the orbital unit 102 and the at least one injectors 105a, 105b, automatically. That is, the control unit 203 may be adapted to operate the device 100 such that, the at least one injectors 105a, 105b are adjusted and pauses the extruder 201 for injecting the filler material. Additionally, the control unit 203 may be configured to receive the user defined inputs such as filler material contour layout, thickness, and other additive manufacturing parameters for operating the device 100 and the components of the system 200. In an implementation, the control unit may determine the filler material contour layout, thickness, and other additive manufacturing parameters automatically by the signals received from the sensor module 202. In an implementation, the control unit 203 may have a common unit which may be configured to control and operate all the components of the system 200 or may be a dedicated unit which may be configured to operate only the device 100. In an implementation, the control unit 203 may include a processing unit, where the processing unit may comprise at least one data processor for executing program components for executing user or system generated requests. The processing unit may be a specialized processing unit such as integrated system controllers, memory management units, floating point units, graphics processing units, digital signal processing units, etc. Further, the control unit 203 may be an electronic control unit, disposed in communication with one or more memory devices via a storage interface to perform predefined or predetermined operations. Additionally, the control unit 203 may be configured to receive inputs from a user or an operator to perform required additive manufacturing operations.

Figure 10:
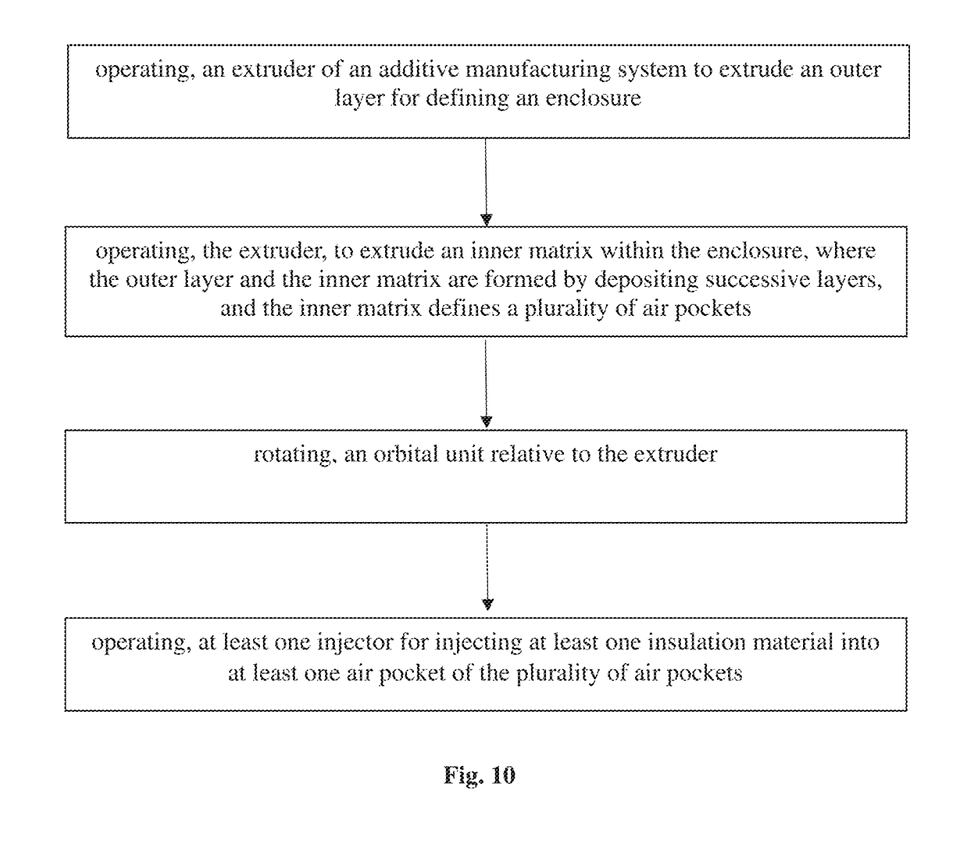
FIG. 10 illustrates a flow chart depicting a method of producing a construction element, according to yet another example of the present disclosure.

Referring now to FIG. 10, which is an exemplary implementation of the present disclosure illustrating a flow chart of a method for producing a construction element 300 by the additive manufacturing process. The order in which the method is described is not intended to be construed as a limitation, and any number of the described steps may be combined in any order to implement the method. Additionally, individual steps may be deleted from the methods without departing from the scope of the subject matter described herein.

In an implementation, in order to additively manufacture the construction component, the system 200 and the device 100 may be operated. Initially, the control unit 203 may receive operational inputs based on the construction element 300 to be manufactured. In an implementation, the operational inputs may be provided by an operator or a user or may be prestored within the control unit 203. The control unit 203 upon receiving the operational inputs may operate, the extruder 201 to extrude an outer layer. The outer layer may define an enclosure of the construction element 300. Further, the control unit 203 may operate the extruder 201 to extrude an inner matrix within the enclosure. The outer layer and the inner matrix may be formed by depositing successive layers of the material that may be extruded by the extruder 201. In an implementation, the inner matrix may be defined by a first layup and a second layup. The first layup may be laid along a first direction and across the enclosure. Further, the second layup may be laid juxtaposing the first layup. The first layup and the second layup may define the plurality of air pockets in the inner matrix.

Further, in an implementation, in order to fill at least one air pocket of the plurality of air pockets with filler material, control unit 203 may be configured to define predefined locations of the plurality of air pockets within the construction element 300 to selectively operate the orbital unit 102 and the at least one injector 105a, 105b for injecting the at least one filler material into at least one air pocket of the plurality of air pockets after depositing each successive layer of the construction element 300. The predefined locations may be identified and informed to the control unit 203 by the operator or the control unit 203 may automatically, detect the locations based on inputs received from the sensor module 202.

In an implementation, the control unit 203 may operate and rotate the orbital unit 102, relative to the extruder 201. That is, the control unit 203 in order to fill the air pockets proximal to the extruder 201 may operate the orbital unit 102. Additionally, in order to fill the air pockets away from the extruder 201, the control unit 203 may be configured to operate the extruder 201 and displace the extruder 201 to a location proximal to the air pockets to be filled. In an implementation, the control unit 203 may be configured to selectively operate the first actuator 106 and the second actuator 107 independently, in order to rotate the first orbital ring 103 and the second orbital ring 104, and position the at least one injector 105a, 105b on each of the first orbital ring 103 and the second orbital ring 104 at the required position. For example, the required position may be the location of the at least one injector 105a, 105b which may be in line with the air pocket to be filled by the filler material. Upon positioning the at least one injector 105a, 105b at the required position, the control unit 203 may actuate the linear actuator 114 to vertically displace the at least one injector 105a, 105b and position the at least one actuator at any point in line with the air pocket to be filled. Further, the control unit 203 may be configured to operate the at least one injector 105a, 105b for injecting the at least one filler material into the at least one air pocket of the plurality of air pockets, as per requirement.

The device 100 and the system 200 are easy to manufacture, assembly, operate and maintain. The device 100 ensures that thermal insulation of the construction element 300 is achieved by filling the air pockets with the filler material. The device 100 mitigates use of separate injection systems to fill the air pockets with insulation materials and prevents removing the construction element 300 from the additive manufacturing system 200 and placing it under the separate injection system or displacing the additive manufacturing system 200 from its initial position to fix the injection system for filling the air pockets. The device 100 prevents misalignments and delays, which may be caused due to removal of the construction element 300 or the system 200 during manufacturing.

Further, rotation of the first orbital ring 103 and the second orbital ring 104 enable simultaneous displacement of the at least one injectors 105a, 105b on both corresponding orbital rings, such that, two air pockets of the plurality of air pockets can be parallelly filled with same or different materials, that enhances the sustainability and efficiency of the additive manufacturing process. Furthermore, the device 100 is adapted to be retrofitted to any type of 3D printers already existing and is capable of being associated with a specifically designed 3D printers as well.

Additionally, the overall production time is reduced due to the device 100 as the device 100 eliminates need of additional steps and hardware for filling the air pockets, thereby, increasing productivity. This decrease in manufacturing time leads to lowered labor requirement and reduces costs involved.

It should be imperative that the device 100, the system 200, the method and any other elements described in the above description should not be considered as a limitation with respect to the figures. Rather, variations to such devices, systems and methods should be considered within the scope of the description.

The invention claimed is:

1. A device connectable to an additive manufacturing system, the device comprising:
   a holder removably connectable to an extruder of the additive manufacturing system;
   an orbital unit concentrically coupled to the holder, and adapted to rotate relative to the holder, the orbital unit comprising a first orbital ring rotatably coupled to the holder and a second orbital ring concentrically disposed on the first orbital ring and being configured to rotate independently of the first orbital ring;
   at least one injector movably coupled to the orbital unit, the at least one injector being configured to inject at least one filler material within a construction element; and
   a control unit associated with the additive manufacturing system and operatively coupled with the orbital unit and the at least one injector, the control unit being configured to selectively rotate the orbital unit and actuate the at least one injector for injecting the at least one filler material within the construction element during additive manufacturing.

2. The device according to claim 1, comprises a first actuator operatively coupled to the first orbital ring, wherein the first actuator is adapted to rotate the first orbital ring relative to the holder.

3. The device according to claim 2, comprises a second actuator operatively coupled to the second orbital ring, wherein the second actuator is adapted to rotate the second orbital ring relative to the first orbital ring.

4. The device according to claim 2, wherein the first orbital ring comprises:
   a first bearing unit secured to an inner circumference of the first orbital ring, the first bearing unit is adapted rotate the first orbital ring relative to the holder; and
   a first gear profile defined on an outer circumference of the first orbital ring, adapted to engage with the first actuator via a mesh.

5. The device according to claim 4, wherein the first actuator comprises a first pinion gear engageable with the first gear profile of the first orbital ring.

6. The device according to claim 3, wherein the second orbital ring comprises:
   a second bearing unit secured to an inner circumference of the second orbital ring, the second bearing unit is adapted rotate the second orbital ring relative to the first orbital ring; and
   a second gear profile defined on an outer circumference of the second orbital ring, adapted to engage with the second actuator via a mesh.

7. The device according to claim 6, wherein the second actuator comprises a second pinion gear engageable with the second gear profile of the second orbital ring.

8. The device according to claim 6, wherein the outer circumference of the first orbital ring is defined with a second groove adapted to engage with the second bearing unit disposed along the inner circumference of the second orbital ring, configured to rotate the second orbital ring relative to the first orbital ring.

9. The device according to claim 1, wherein the at least one injector is movably coupled to each of the first orbital ring and the second orbital ring to inject the at least one filler material.

10. The device according to claim 1, wherein the at least one injector is operatively coupled to a linear actuator, the linear actuator is adapted to displace the at least one injector vertically relative to the orbital unit.

11. The device according to claim 1, wherein the at least one injector comprises a heating unit, adapted to melt the at least one filler material stored in the at least one injector.

12. An additive manufacturing system for producing a construction element, the system comprising:
- an extruder adapted to extrude a material layer-by-layer for producing the construction element;
- a sensor module connectable to the extruder, the sensor module configured to detect one or more predetermined parameters of the construction element;
- a control unit communicatively coupled to the extruder and the sensor module, the control unit configured to regulate movement of the extruder, based on signals corresponding to the one or more predetermined parameters received from the sensor module; and
- a device comprising:
- a holder removably connectable to the extruder;
- an orbital unit concentrically coupled to the holder, and adapted to rotate relative to the holder, the orbital unit comprising a first orbital ring rotatably coupled to the holder and a second orbital ring concentrically disposed on the first orbital ring and being configured to rotate independently of the first orbital ring;
- at least one injector movably coupled to the orbital unit, the at least one injector being configured to inject at least one filler material within the construction element; and
- the control unit associated with the extruder and the sensor module, and operatively coupled with the orbital unit and the at least one injector, the control unit being configured to selectively rotate the orbital unit and actuate the at least one injector for injecting the at least one filler material within the construction element during additive manufacturing.

13. The system according to claim 12, comprises a first actuator operatively coupled to the first orbital ring, wherein the first actuator is adapted to rotate the first orbital ring relative to the holder.

14. The system according to claim 13, comprises a second actuator operatively coupled to the second orbital ring, wherein the second actuator is adapted to rotate the second orbital ring relative to the first orbital ring.

15. The system according to claim 13, wherein the first orbital ring comprises:
- a first bearing unit secured to an inner circumference of the first orbital ring, the first bearing unit is adapted rotate the first orbital ring relative to the holder; and
- a first gear profile defined on an outer circumference of the first orbital ring, adapted to engage with the first actuator via a mesh.

16. The system according to claim 14, wherein the second orbital ring comprises:
- a second bearing unit secured to an inner circumference of the second orbital ring, the second bearing unit is adapted rotate the second orbital ring relative to the first orbital ring; and
- a second gear profile defined on an outer circumference of the second orbital ring, adapted to engage with the second actuator via a mesh.

17. The system according to claim 12, wherein the at least one injector is movably coupled to each of the first orbital ring and the second orbital ring to inject the at least one filler material.

\* \* \* \* \*